United States Patent
Etou et al.

(10) Patent No.: US 9,599,980 B2
(45) Date of Patent: Mar. 21, 2017

(54) NUMERICAL CONTROLLER HAVING SUPPRESSOR THAT SUPPRESSES VARIATION IN VELOCITY DUE TO ABRUPT CHANGE IN POSITIONAL DEVIATION

(71) Applicant: FANUC Corporation, Minamitsuru-gun, Yamanashi (JP)

(72) Inventors: Kouichi Etou, Minamitsuru-gun (JP); Takehiro Yamaguchi, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 14/797,373

(22) Filed: Jul. 13, 2015

(65) Prior Publication Data
US 2016/0026170 A1 Jan. 28, 2016

(30) Foreign Application Priority Data
Jul. 25, 2014 (JP) ................................ 2014-152292

(51) Int. Cl.
G05B 19/416 (2006.01)
(52) U.S. Cl.
CPC .. *G05B 19/416* (2013.01); *G05B 2219/43146* (2013.01); *G05B 2219/45146* (2013.01)
(58) Field of Classification Search
None
See application file for complete search history.

(56) References Cited

U.S. PATENT DOCUMENTS 5,379,656 A * 1/1995 Schrauwen ........ B65H 23/0204
73/865.9
5,936,864 A * 8/1999 Otsuki .................. G05B 19/41
318/568.15

(Continued)

FOREIGN PATENT DOCUMENTS

JP H04-362702 A 12/1992
JP 2007-172394 A 7/2007

(Continued)

OTHER PUBLICATIONS

Notification of Reasons for Refusal issued Nov. 17, 2015 in Japanese Patent Application No. 2014-152292 (4 pages) with an English Translation (3 pages).

*Primary Examiner* — Shawki S Ismail
*Assistant Examiner* — Muhammad S Islam
(74) *Attorney, Agent, or Firm* — Drinker Biddle & Reath LLP (57) ABSTRACT

A numerical controller includes a commanded movement-amount adjustment section, in addition to a position command section and a positional deviation counter but also. The commanded movement-amount adjustment section calculates an adjusted command movement amount based on a commanded movement amount output from the position command section, positional deviation acquired from the positional deviation counter, and an actual velocity of a control axis, and outputs the calculated adjusted command movement amount to the positional deviation counter. When a load acts on a servo motor so that positional deviation is accumulated and the load is abruptly removed, a situation in which the servo motor abruptly accelerates with its maximum torque in an attempt to eliminate the accumulated positional deviation is avoided.

9 Claims, 6 Drawing Sheets

(56) References Cited

U.S. PATENT DOCUMENTS

| | | | |
|---|---|---|---|
| 6,539,275 B1 * | 3/2003 | Mizuno | G05B 19/416 700/159 |
| 2003/0014151 A1 * | 1/2003 | Nigazawa | G05B 19/414 700/186 |
| 2007/0145931 A1 * | 6/2007 | Onishi | B22D 17/32 318/569 |
| 2009/0009126 A1 * | 1/2009 | Hishikawa | G05B 19/416 318/600 |
| 2009/0230910 A1 | 9/2009 | Hishikawa et al. | |
| 2010/0030368 A1 * | 2/2010 | Hon | G01B 5/20 700/195 |
| 2011/0246115 A1 * | 10/2011 | Hon | G01B 5/008 702/95 |

FOREIGN PATENT DOCUMENTS

| | | |
|---|---|---|
| JP | 2009-032251 A | 2/2009 |
| JP | 2009-217627 A | 9/2009 |

* cited by examiner

NUMERICAL CONTROLLER HAVING SUPPRESSOR THAT SUPPRESSES VARIATION IN VELOCITY DUE TO ABRUPT CHANGE IN POSITIONAL DEVIATION

RELATED APPLICATION DATA

This application claims priority under 35 U.S.C. §119 and/or §365 to Japanese Application No. 2014-152292 filed Jul. 25, 2014, the entire contents is incorporated herein by reference.

BACKGROUND OF THE INVENTION

Field of the Invention

The present invention relates to a numerical controller capable of suppressing variation in velocity due to an abrupt change in positional deviation.

Description of the Related Art

A numerical controller that causes a servo motor to drive a control axis, such as a movable portion of a machine or any other apparatus, and controls the position of the control axis, typically performs position loop control. In the position loop control, the servo motor abruptly decelerates or accelerates due to an influence of a positional deviation counter used in positional control so that smooth operation is prevented in some cases. As one solution to the problem, for example, Japanese Patent Application Laid-Open No. 2007-172394 discloses a technology that allows smooth movement of the control axis by adding an amount of positional deviation corresponding to an actual velocity acquired when a state in which no current is allowed to flow through the servo motor (serve-off state) is switched to a state in which current is allowed to flow therethrough (serve-on state) to an commanded movement amount issued to the servo motor in a first movement-command output cycle after the switching operation.

In the technology described above, however, the commanded movement amount issued to the servo motor is so outputted that the actual velocity at which the control axis moves when the servo-off state is switched to the servo-on state is set to be an initial velocity. The following problem therefore remains unsolved: When some type of load, such as external force, acts on the servo motor being driven in the servo-on state under the position loop control, and the load is abruptly removed after positional deviation is accumulated, the servo motor abruptly accelerates with its maximum torque in an attempt to eliminate the accumulated positional deviation, resulting in an unstable velocity.

Figure 7:
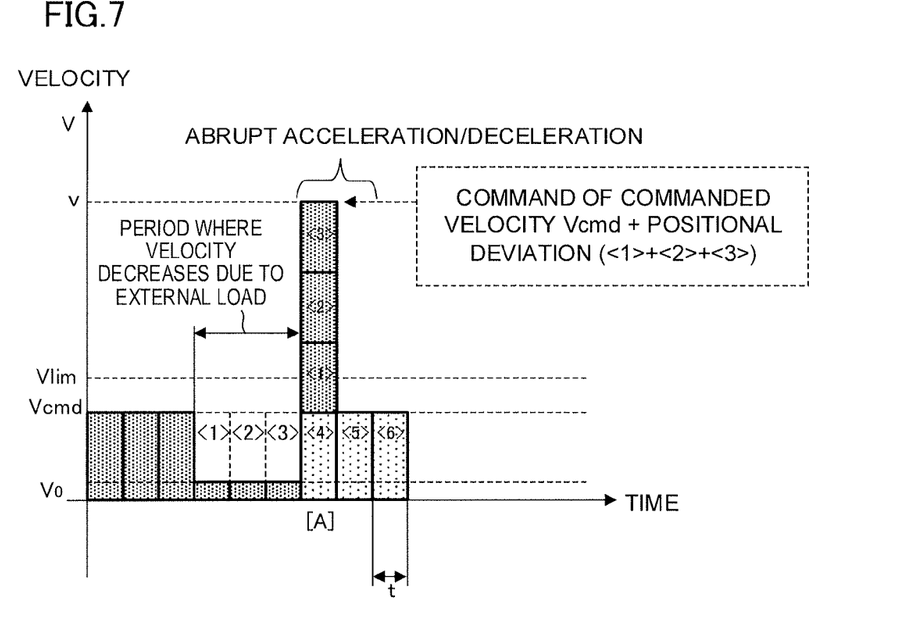
FIG. 7 illustrates a problem with serve motor velocity control in related art.

For example, when the velocity of a drive axis based on a commanded movement amount Pcmd in each distributed cycle is controlled to be a constant velocity Vcmd, positional deviation Err accumulated in a positional deviation counter is typically constant, as shown in FIG. 7. However, when an actual velocity V0 of the drive axis decreases due to an applied load, the discrepancy <1>, <2>, and <3> between the commanded movement amount and the actual movement amount of the drive axis increases, resulting in an increase in positional deviation Err. When the load is then abruptly removed, the actual velocity V0 of the drive axis abruptly changes in the following distributed cycle [A] because the positional deviation Err is instantly eliminated, undesirably resulting in unstable action of the drive axis.

SUMMARY OF THE INVENTION

An object of the invention is to provide a numerical controller capable of handling a situation in which a load acts on a servo motor so that positional deviation is accumulated and the load is abruptly removed and preventing the servo motor from abruptly accelerating with its maximum torque in an attempt to eliminate the accumulated positional deviation.

In a numerical controller according to the present invention, positional deviation is obtained by a positional deviation counter based on a commanded position according to a commanded movement amount output from a position command section and a detected actual position in each movement-command output cycle, and position loop control is carried out based on the determined positional deviation to drive and control a control axis. The numerical controller includes a commanded movement-amount adjustment section that calculates an adjusted command movement amount based on the commanded movement amount output from the position command section, the positional deviation acquired from the positional deviation counter, and an actual velocity of the control axis, and outputs the calculated adjusted command movement amount to the positional deviation counter.

The commanded movement-amount adjustment section may be configured to calculate the adjusted command movement amount in such a way that the adjusted command movement amount does not exceed a predetermined maximum commanded movement amount. In this case, the predetermined maximum commanded movement amount may be a setting value set as a parameter of the numerical controller, a commanded value issued by a program run in the numerical controller, or a commanded value issued in the form of an input signal to the numerical controller.

The commanded movement-amount adjustment section may be configured to calculate the adjusted command movement amount based on a commanded acceleration that specifies the rate of a change in the adjusted command movement amount in each movement-command output cycle. In this case, the commanded acceleration may be a setting value set as a parameter of the numerical controller, a commanded value issued by a program run in the numerical controller, or a commanded value issued in the form of an input signal to the numerical controller.

According to the present invention, when some type of load acts on a servo motor in operation under position feedback control so that positional deviation is accumulated and the load is then abruptly removed, the servo motor does not abruptly accelerate but can return to a target position and a target velocity. As a result, for example, after a workpiece or any other obstacle is stuck in an operation section of a conveyance machine driven with a servo motor so that the operating velocity of the servo motor decreases with the load acting thereon, and the load is then removed, a situation in which the machine abruptly operates at a high velocity can be avoided, and the machine can quickly return to a normal controlled state in which a target position and a target velocity are achieved as commanded.

BRIEF DESCRIPTION OF THE DRAWINGS

The object and feature of the present invention described above and other objects and features thereof will be apparent from the following description of embodiments with reference to the accompanying drawings, in which.

DETAILED DESCRIPTION OF THE PREFERRED EMBODIMENTS

Figure 1:
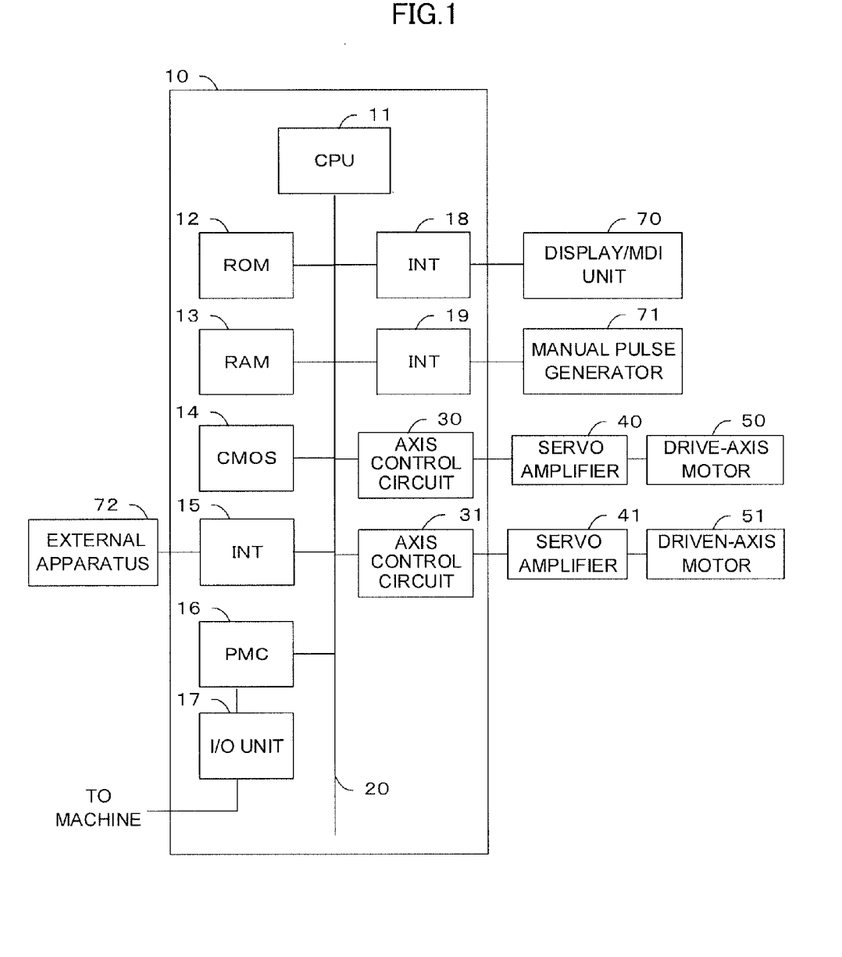
FIG. 1 is a block diagram of key portions of a numerical controller according to the present invention.

FIG. 1 is a block diagram of key portions of a numerical controller 10 according to the present invention.

A CPU 11 reads a system program stored in a ROM 12 via a bus 20 and controls the numerical controller 10 as a whole in accordance with the read system program. A RAM 13 stores temporary calculation data and display data and further stores a variety of data inputted by an operator via a display/MDI unit 70.

A CMOS 14 is configured as a nonvolatile memory that is backed up with a battery that is not shown so that a stored state is held even when the numerical controller 10 is powered off. The CMOS 14 stores a machining program read via an interface 15, a machining program inputted via the display/MDI unit 70, and other types of information. The ROM 12 further stores a variety of pre-written system programs for carrying out a process of an edit mode necessary for creation and editing of a machining program and a process for automatic operation.

The variety of machining programs, such as a machining program for implementing the present invention, can be inputted via the interface 15 and the display/MDI unit 70 and stored in the CMOS memory 14.

The interface 15 allows connection between the numerical controller 10 and an external apparatus 72, such as an adapter. A machining program, a variety of parameters, and other types of information are read from the external apparatus 72. A machining program edited in the numerical controller 10 can be stored in an external storage section via the external apparatus 72.

A programmable machine controller (PMC) 16 outputs a signal via an I/O unit 17 to an auxiliary device (an actuator, such as a robot hand for tool exchange, for example) in a machine tool based on a sequence program built in the numerical controller 10 to control the auxiliary device. The PMC 16 also receives signals from a variety of switches on an operation board disposed in a main body of the machine tool, performs necessary processing on the signals, and delivers the processed signals to the processor 11.

The display/MDI unit 70 is a manual data input device including a display, a keyboard, and other components, and an interface 18 receives a command and data from the keyboard in the display/MDI unit 70 and delivers them to the CPU 11. An interface 19 is connected to an operation board 71 including a manual pulse generator and other components.

Axis control circuits 30 and 31 associated with respective axes receive commanded movement amounts of the respective axes and output commands associated with the respective axes to servo amplifiers 40 and 41. The servo amplifiers 40 and 41 receive the commands and drive a drive-axis motor 50 and a driven-axis motor 51. Each of the axes is provided with a servo motor having a built-in position/velocity detector, and a position/velocity feedback signal from the position/velocity detector is fed back to the corresponding one of the axis control circuits 30 and 31 for feedback control. In the block diagram of FIG. 1, the configuration of the position/velocity feedback is omitted.

Figure 2:
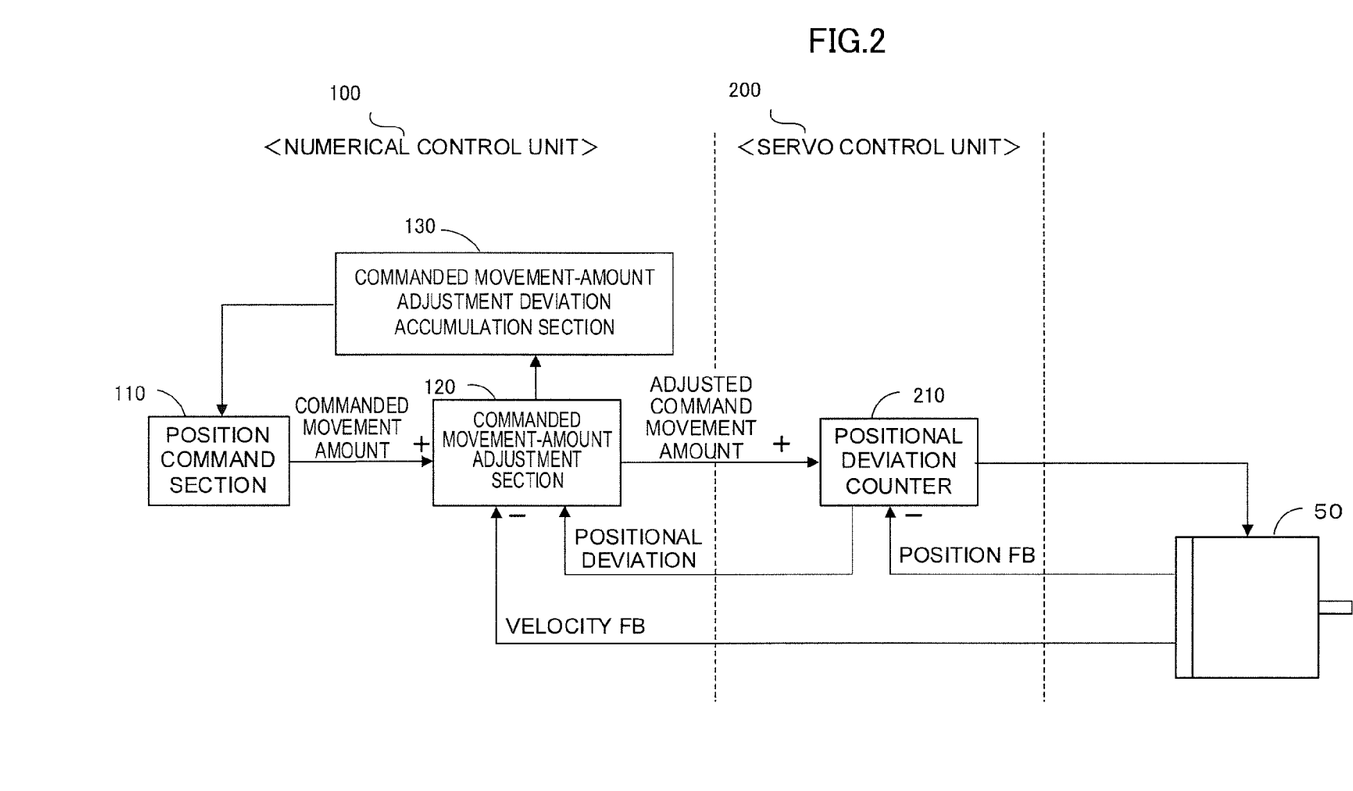
FIG. 2 is a functional block diagram showing the function of the numerical controller in FIG. 1.

FIG. 2 is a functional block diagram showing the function of the numerical controller in FIG. 1.

The numerical controller 10 is primarily formed of a numerical control unit 100 and a servo control unit 200. The numerical control unit 100 includes a position command section 110, a commanded movement-amount adjustment section 120, and a commanded movement-amount adjustment deviation accumulation section 130, and the servo control unit 200 includes a positional deviation counter 210.

The position command section 110 calculates a commanded movement amount the drive-axis motor 50 should operate based on a movement command commanded by a machining program or an operator and a residual movement amount acquired from the commanded movement-amount adjustment deviation accumulation section 130 and outputs the calculated commanded movement amount.

The present invention is characterized in that the numerical control unit 100 of the numerical controller 10 includes the commanded movement-amount adjustment section 120. The commanded movement-amount adjustment section 120 carries out a commanded movement amount adjustment process, which will be described later, to calculate an adjusted command movement amount in a movement-command output cycle based on the commanded movement amount outputted from the position command section 110, positional deviation acquired from the positional deviation counter 210 in the servo control unit 200, and a velocity feedback value fed back from the drive-axis motor 50 and outputs the calculated adjusted command movement amount to the positional deviation counter 210 and the commanded movement-amount adjustment deviation accumulation section 130.

The commanded movement-amount adjustment deviation accumulation section 130 accumulates the adjusted command movement amount acquired from the commanded movement-amount adjustment section 120 on the residual movement amount and outputs the accumulated value to the position command section 110.

The positional deviation counter 210 subtracts a position feedback value from the position/velocity detector (not shown) that is provided in the drive-axis motor 50 from the adjusted command movement amount from the commanded movement-amount adjustment section 120 to determine positional deviation. The servo control unit 200 controls the velocity of the drive-axis motor 50 based on the positional deviation determined by the positional deviation counter 210. The process of controlling the drive-axis motor 50 based on the positional deviation in the servo control unit 200 will not be further described because the process is a known process that have been carried out in a numerical controller that controls a machine or any other apparatus.

An outline of a first example of a commanded movement amount adjustment process carried out by the commanded movement-amount adjustment section 120 in FIG. 2 will be described with reference to FIGS. 3 and 4.

Figure 3:
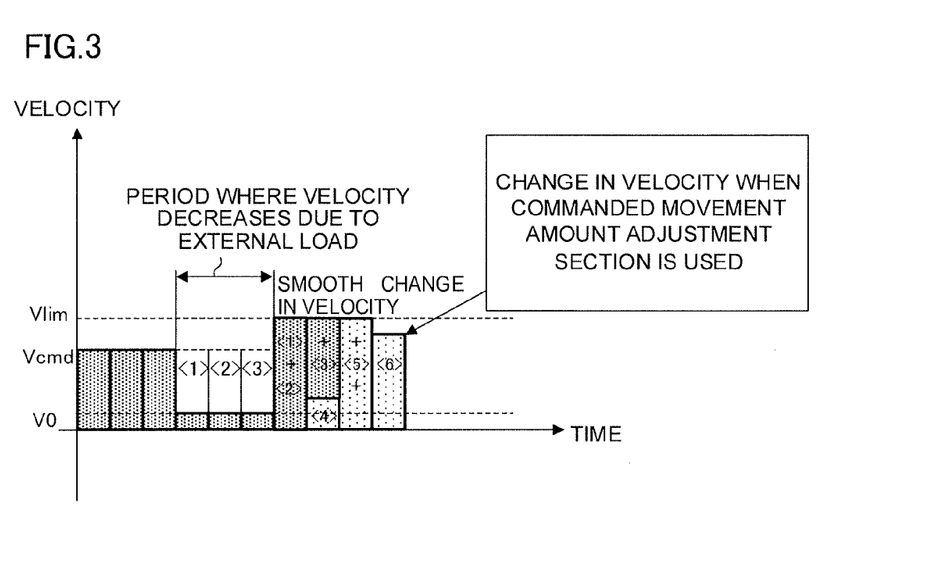
FIG. 3 illustrates an outline of changes in the velocity of a drive axis motor according to a first example of a commanded movement amount adjustment process carried out by a commanded movement-amount adjustment section in the numerical controller in FIG. 2.

FIG. 3 describes an outline of changes in velocity of the drive-axis motor 50 in FIG. 2.

In the numerical controller 10, in a situation in which the drive-axis motor 50 is driven at a velocity greater than a limit velocity Vlim thereof, the movement amount commanded to the drive-axis motor 50 in a distributed cycle, as shown in FIG. 7 (distributed cycle [A] in FIG. 7) cancels positional deviation (<1>+<2>+<3>) accumulated in the positional deviation counter 210, which is greater than or equal to a commanded velocity Vcmd, and the difference (Vcmd−V0) between the commanded velocity Vcmd and the actual velocity V0 lowered by an external load, and an adjusted command movement amount Pout is so calculated that the actual velocity of the drive-axis motor 50 is clamped at the limit velocity Vlim as shown in FIG. 3 and output to the servo control unit 200. The cancelled positional deviation (<1>+<2>+<3>) and the velocity difference (Vcmd−V0) are output to the commanded movement-amount adjustment deviation accumulation section 130 and accumulated as the residual movement amount.

Figure 4:
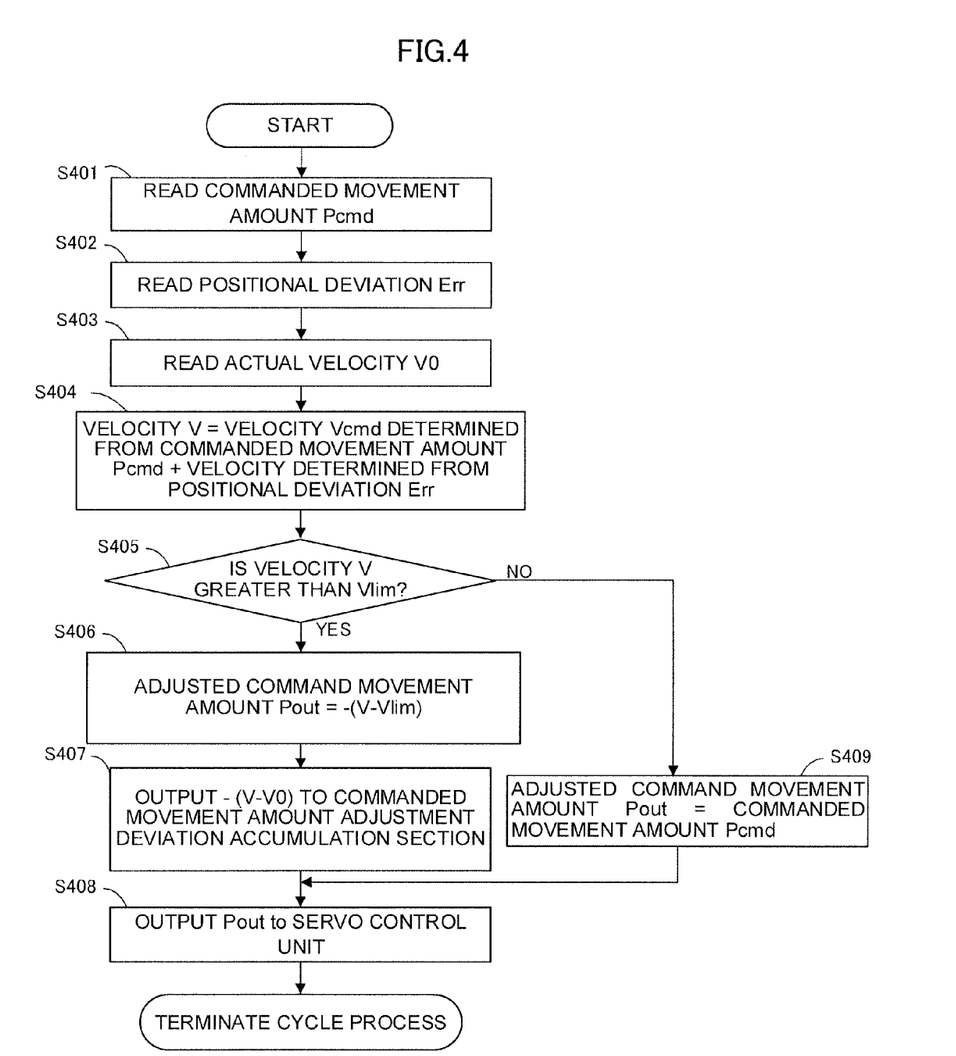
FIG. 4 is a flowchart showing the first example of the commanded movement amount adjustment process carried out by the commanded movement-amount adjustment section in the numerical controller in FIG. 2.

FIG. 4 is a flowchart showing the first example of the commanded movement amount adjustment process carried out by the commanded movement-amount adjustment section 120. The processing is now explained according to respective steps with reference to the flowchart of FIG. 4.

[Step S401] A commanded movement amount Pcmd issued to the servo control unit 200 is acquired.

[Step S402] A positional deviation Err is acquired from the positional deviation counter 210.

[Step S403] The actual velocity V0 fed back from the drive-axis motor 50 is acquired.

[Step S404] The commanded movement amount Pcmd acquired in step S401 is converted into the movement amount in each distributed cycle (t) to determine the commanded velocity Vcmd, and the positional deviation Err read in step S402 is converted into the movement amount in each distributed cycle (t) to determine a velocity Verr based on the positional deviation, and the determined velocity Vcmd is added to the velocity Verr to obtain a velocity V.

[Step S405] It is determined whether the velocity V is greater than the limit velocity Vlim or not. When the velocity V is greater than the limit velocity Vlim (YES), the process proceeds to step S406, whereas when the velocity V is smaller than or equal to the limit velocity Vlim (NO), the process proceeds to step S409.

[Step S406] An adjusted movement amount Vadj (=−(V−V0)) used to cancel the velocity V is calculated from the difference between the velocity V and the actual velocity V0 (V−V0) as represented by the following expression (1), and then the difference (Vlim−V0) between the limit velocity Vlim and the actual velocity V0 is added to the adjusted movement amount Vadj (=−(V−V0)) used to cancel the velocity V described above as represented by the following expression. (2) to calculate the adjusted command movement amount Pout.

$$Vadj = -(V - Vcmd - V0) = -(V - V0) \quad (1)$$

$$Pout = -(V - V0) + Vlim - V0 = -(V - Vlim) \quad (2)$$

[Step S407] The adjusted travel Vadj (=−(V−V0)), which has been calculated in step S406 and is used to cancel the velocity V is output to the commanded movement-amount adjustment deviation accumulation section 130.

[Step S408] The adjusted command movement amount Pout (=−(V−Vlim)), which has been calculated in step S406, is output to the servo control unit 200, and the commanded movement amount adjustment process in this distributed cycle is terminated.

[Step S409] The commanded movement amount Pcmd is set to be the adjusted commend movement amount Pout, and proceed to step S408.

As described above, when the velocity abruptly changes, the commanded movement-amount adjustment section 120 adjusts the commanded movement amount to be issued to the servo control unit 200 to suppress the abrupt change in the velocity, and the commanded movement-amount adjustment deviation accumulation section. 130 feeds the thus suppressed movement amount back to the residual movement amount used by the position command section 110, whereby the drive axis can be controlled based on a command with the abrupt change in the velocity of the drive axis suppressed.

A summary of a second example of the commanded movement amount adjustment process carried out by the commanded movement-amount adjustment section 120 in FIG. 2 will next be described with reference to FIGS. 5 and 6.

In the second example of the commanded movement amount adjustment process, specified acceleration Acmd is further set in the commanded movement amount adjustment process carried out by the commanded movement-amount adjustment section 120 to adjust the adjusted command movement amount Pout so that change in the velocity of the drive-axis motor 50 undergoes transitions at a velocity determined from the commanded acceleration.

Figure 5:
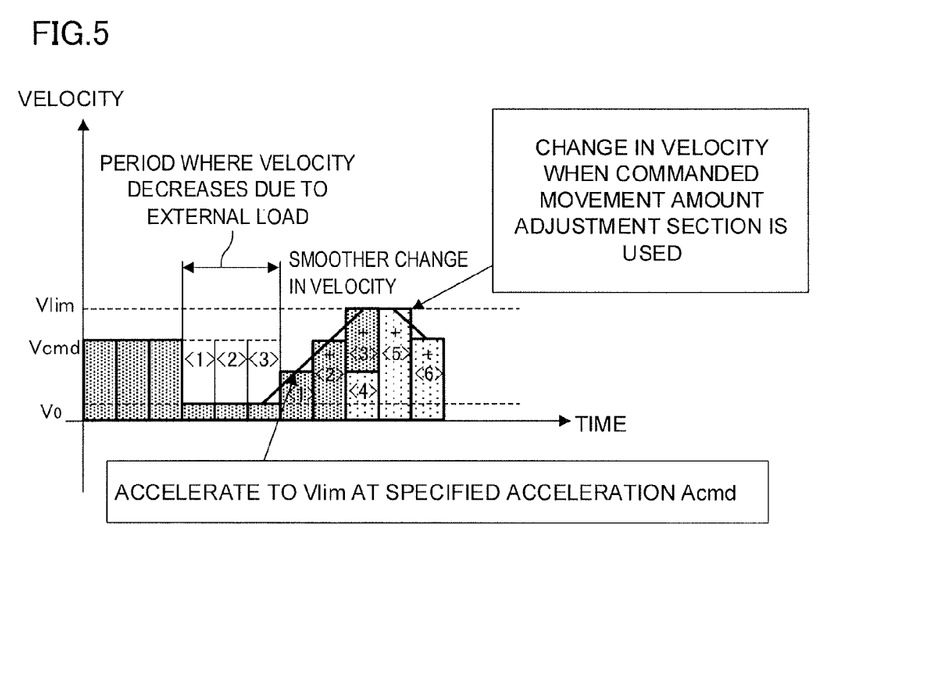
FIG. 5 illustrates an outline of changes in the velocity of the drive axis motor according to a second example of the commanded movement amount adjustment process carried out by the commanded movement-amount adjustment section in the numerical controller in FIG. 2.

FIG. 5 describes an outline of changes in the velocity of the drive-axis motor 50 in FIG. 2.

In the numerical controller 10, in a situation in which the drive-axis motor 50 is driven at a velocity greater than a limit velocity Vlim thereof, the movement amount commanded to the drive-axis motor 50 in a distributed cycle, as shown in FIG. 7 (distributed cycle [A] in FIG. 7) cancels positional deviation (<1>+<2>+<3>) accumulated in the positional deviation counter 210, which is greater than or equal to a commanded velocity Vcmd, and the difference (Vcmd−V0) between the commanded velocity Vcmd and the actual velocity V0 lowered by an external load, and an adjusted command movement amount Pout is so calculated that the actual velocity of the drive-axis motor 50 undergoes gentle a transition as shown in FIG. 5 and output to the servo control unit 200. The cancelled positional deviation (<1>+<2>+<3>) and the velocity difference (Vcmd−V0) are output to the commanded movement-amount adjustment deviation accumulation section 130 and accumulated as the residual movement amount. Thereafter, until the velocity reaches the limit velocity Vlim, an adjusted command movement amount Pout determined from the actual velocity V0 and the specified acceleration Acmd are calculated in each distributed cycle and issued to the servo control unit 200. After the velocity reaches the limit velocity Vlim, the velocity of the drive-axis motor 50 is so controlled that it is clamped at the limit velocity Vlim.

The specified acceleration Acmd may be set at a value within a set region provided in advance, for example, in the CMOS 14 in consideration of the performance of each of the drive-axis motors or may be issued by a program, such as an NC program, or an input signal to the numerical controller 10.

Figure 6:
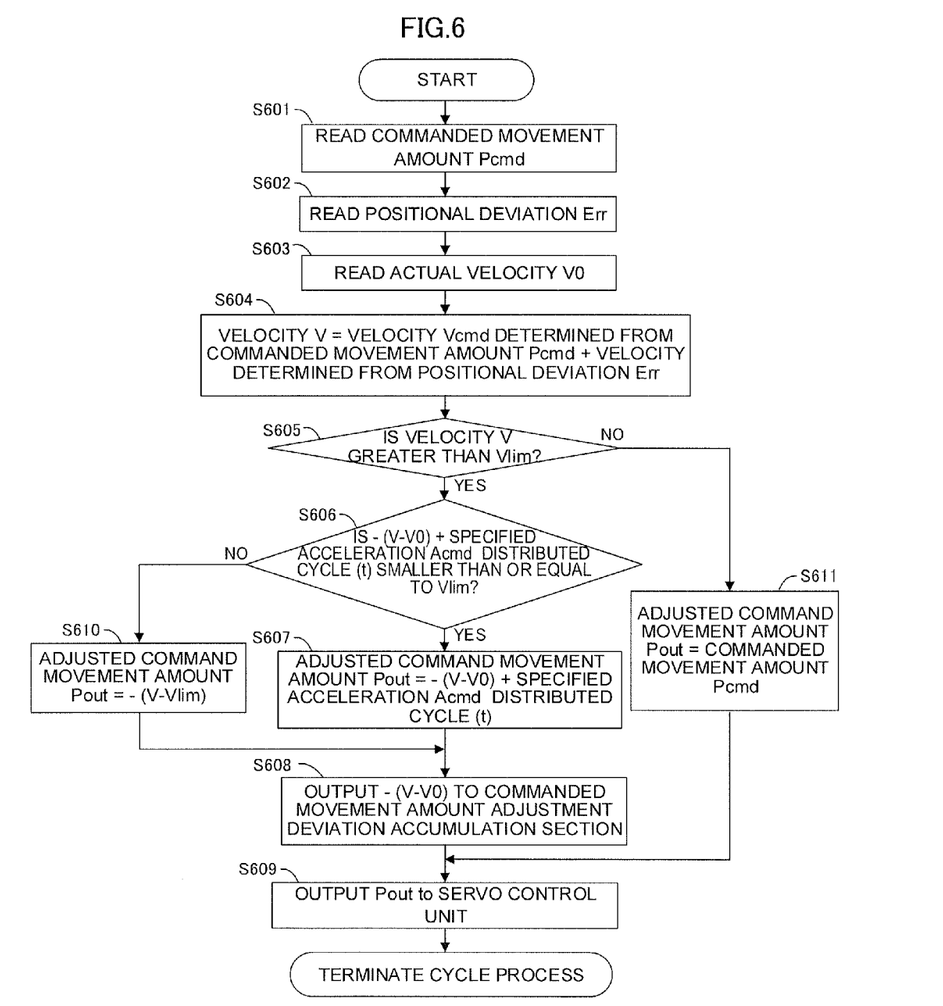
FIG. 6 is a flowchart showing the second example of the commanded movement amount adjustment process carried out by the commanded movement amount adjustment portion in the numerical controller shown in FIG. 2.

FIG. 6 is a flowchart showing the second example of the commanded movement amount adjustment process carried out by the commanded movement-amount adjustment section 120. The processing is now explained according to respective steps with reference to the flowchart of FIG. 6.

[Step S601] The commanded movement amount Pcmd issued to the servo control unit 200 is acquired.

[Step S602] The positional deviation Err is acquired from the positional deviation counter 210.

[Step S603] The actual velocity V0 fed back from the drive-axis motor 50 is acquired.

[Step 604] The commanded movement amount Pcmd acquired in step S601 is converted into the movement amount in each distributed cycle (t) to determine the commanded velocity Vcmd, the positional deviation Err read in step S602 is converted into the movement amount in each distributed cycle (t) to determine the velocity Verr based on the positional deviation, and the determined velocity Vcmd is added to the velocity Verr to calculate the velocity V.

[Step S605] It is determined whether the velocity V is greater than the limit velocity Vlim or not. When the velocity V is greater than the limit velocity Vlim (YES), the process proceeds to step S606, whereas when the velocity V is smaller than or equal to the limit velocity Vlim (NO), the process proceeds to step S609.

[Step S606] It is determined whether or not the adjusted command movement amount Pout, obtained by adding the movement amount (Acmd×t) determined from the specified acceleration Acmd to the adjusted movement amount Vadj (=−(V−V0)) used to cancel the velocity V is smaller than or equal to Vlim. When the Pout is smaller than or equal to Vlim, the process proceeds to step S607, whereas when Pout is greater than Vlim, the process proceeds to S610.

[Step S607] The adjusted movement amount Vadj (=−(V−V0)) used to cancel the velocity V is calculated based on the difference (V−V0) between the velocity V and the actual velocity V0, as represented by the above expression (1), and then the movement amount (Acmd×t) determined from the commanded acceleration is added to the adjusted travel Vadj, as represented by the following expression (3), to calculate the adjusted command movement amount Pout.

$$Pout = -(V-V0) + Acmd \times t \quad (3)$$

[Step S608] The adjusted travel Vadj (=−(V−V0)) used to cancel the velocity V is output to the commanded movement-amount adjustment deviation accumulation section 130.

[Step S609] The adjusted command movement amount Pout is output to the servo control unit 200.

[Step S610] The difference (Vlim−V0) between the limit velocity Vlim and the actual velocity V0 is added to the adjusted travel Vadj (=−(V−V0)) used to cancel the velocity V to calculate the adjusted command movement amount Pout, as represented by the above expression (2), that is, the following calculation $$Pout = (Vlim-V0) - (V-V0) = Vlim - V$$

is carried out to calculate the adjusted command movement amount Pout (=Vlim−V), and the process proceeds to step S608.

[Step S611] The commanded movement amount Pcmd is set to be the adjusted command movement amount Pout, and the process proceed to step S609.

As described above, in the second example of the commanded movement amount adjustment process, when the velocity abruptly changes, the commanded movement-amount adjustment section. 120 can adjust the commanded movement amount to be issued to the servo control unit 200 to suppress the abrupt change in the velocity and adjust the adjusted command movement amount Pout in such a way that changes in the velocity of the drive axis undergoes gentle transition at the velocity determined from the specified acceleration Acmd.

What is claimed is:

1. A numerical controller, in which positional deviation is obtained by a positional deviation counter based on a commanded position according to a commanded movement amount output from a position command section and a detected actual position in each movement-command output cycle, and position loop control is carried out based on the determined positional deviation to drive and control a control axis, the numerical controller comprising:
   a commanded movement-amount adjustment section configured to:
      calculate an adjusted command movement amount based on the commanded movement amount output from the position command section, the positional deviation acquired from the positional deviation counter, and an actual velocity of the control axis detected by a velocity detector of the control axis, and
      output the calculated adjusted command movement amount to the positional deviation counter: and
   a commanded movement-amount adjustment deviation accumulation section configured to:
      accumulate a residual movement amount based on the adjusted command movement amount calculated by the commanded movement-amount adjustment section, and
      output the accumulated residual movement amount to the position command section,
   wherein the residual movement amount is used to calculate the commanded movement amount in the position command section, and
   wherein the adjusted command movement amount is calculated based on the actual velocity in each movement-command output cycle.

2. The numerical controller according to claim 1, wherein the commanded movement-amount adjustment section is configured to calculate the adjusted command movement amount in such a way that the adjusted command movement amount does not exceed a predetermined maximum commanded movement amount.

3. The numerical controller according to claim 1, wherein the commanded movement-amount adjustment section is configured to calculate the adjusted command movement amount based on a commanded acceleration that specifies the rate of a change in the adjusted command movement amount in each movement-command output cycle.

4. The numerical controller according to claim 2, wherein the predetermined maximum commanded movement amount is a setting value set as a parameter of the numerical controller.

5. The numerical controller according to claim 2, wherein the predetermined maximum commanded movement amount is a commanded value issued by a program run in the numerical controller.

6. The numerical controller according to claim 2, wherein the predetermined maximum commanded movement amount is a commanded value issued in the form of an input signal to the numerical controller.

7. The numerical controller according to claim 3, wherein the commanded acceleration is a setting value set as a parameter of the numerical controller.

8. The numerical controller according to claim 3, wherein the commanded acceleration is a commanded value issued by a program run in the numerical controller.

9. The numerical controller according to claim 3, wherein the commanded acceleration is a commanded value issued in the form of an input signal to the numerical controller.

\* \* \* \* \*